Sept. 26, 1933.   C. W. DARRAH ET AL   1,928,094
VEHICLE HEATER
Filed March 28, 1930   2 Sheets-Sheet 2

Inventors
Carl W. Darrah &
John R. Holmes
By Blackmore, Spencer & Hulse
Attorneys Patented Sept. 26, 1933

1,928,094

UNITED STATES PATENT OFFICE 1,928,094

VEHICLE HEATER

Carl W. Darrah and John R. Holmes, Lockport, N. Y., assignors to Harrison Radiator Corporation, Lockport, N. Y., a corporation of New York Application March 28, 1930. Serial No. 439,620

8 Claims. (Cl. 257—137)

This invention relates to vehicle heaters and more particularly to that type of heater in which the liquid in the engine cooling circulating system is caused to flow through a heat radiating member through which air is forced by a motor driven fan in order that it may become heated and then discharged into the body of the vehicle.

An object of this invention is to provide a heater of this general type which is so devised that the heated air will not be forced directly back into contact with the occupants of the front seat as has heretofore been the case, but will be forced downwardly against the inclined toe boards, which will divert it toward the sides and the rear of the body compartment and will diffuse it to bring about a more general and uniform heating action. Instead of concentrating all of the heated air in a relatively small area, it is spread out and warms evenly all of the space in the body compartment. The principal entrances for cold air into the car body are through the openings around the foot pedals, and around the doors, and by forcing the heated air downwardly and thereby diffusing it toward the rear and sides of the body, the cold air entering the vehicle is warmed before it reaches the occupants.

A further advantage of constructing the heater so that the heated air is directed downwardly instead of rearwardly is that the heater may be mounted high up on the rear side of the dash board, immediately under the cowl, where it will be out of the way and will not cut down the space provided for the feet of the occupants of the vehicle. In the usual type of hot water heater where the heated air is discharged toward the rear of the body compartment, the heater must be supported low enough on the dash board to cause the top of the heat radiating unit to come below the bottom of the instrument board, so that the latter will not interfere with the flow of the discharged air back into the body compartment.

Further objects of this invention are to provide a heater of this type in which a maximum area of heat radiating surface may be utilized in a casing which is of relatively small size, and in which the heat radiating member may be easily and quickly removed from the casing for repair or replacement purposes, without necessitating the removal of the casing from the dash board, or in any way interfering with the fan or its driving motor and electrical connections.

Other objects and advantages will be apparent upon referring to the specification and accompanying drawings, in which.

Figure 1:
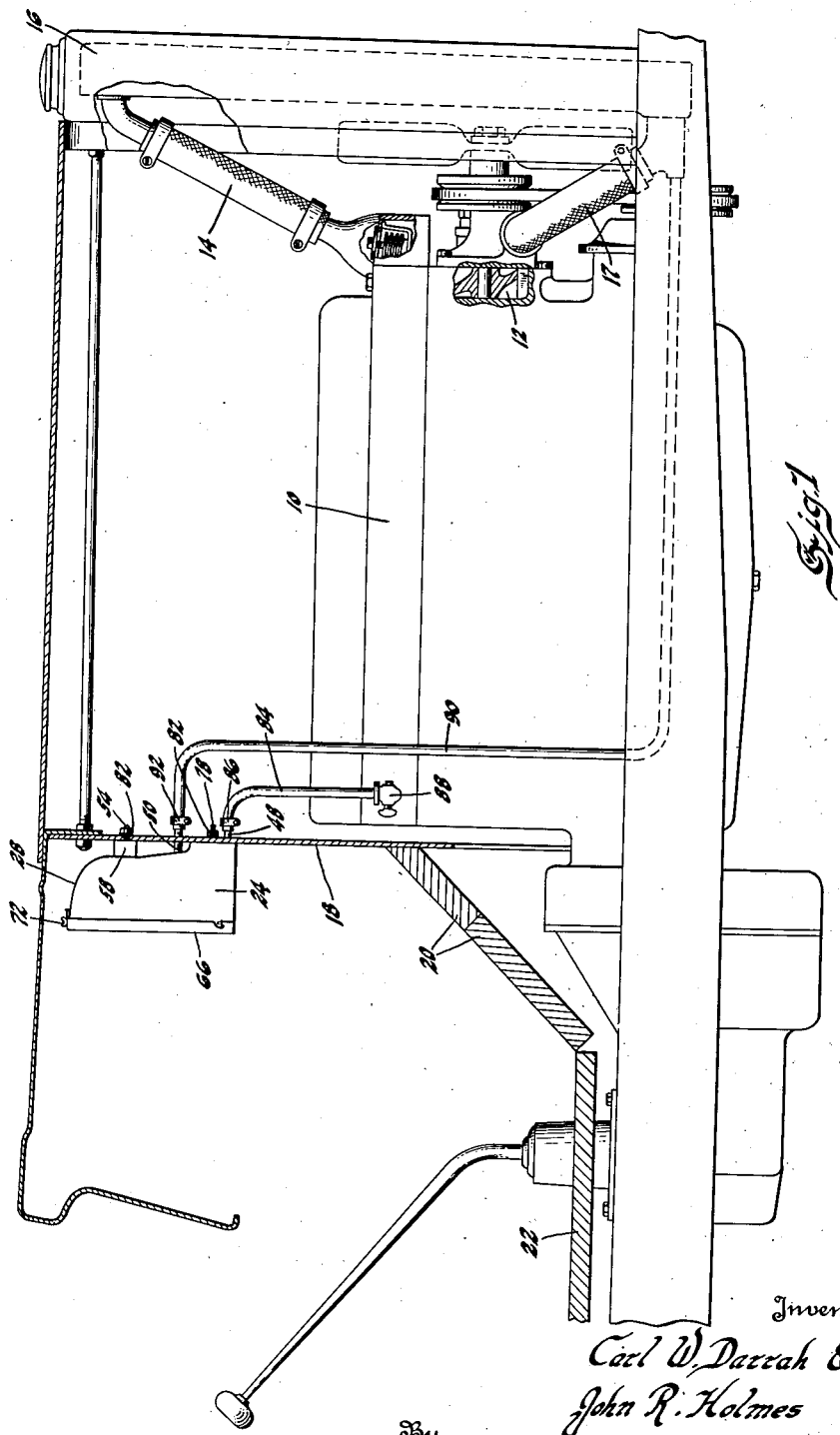
Figure 1 is a longitudinal vertical section through the front portion of a motor vehicle, showing our improved heater installed thereon.
Figure 2:
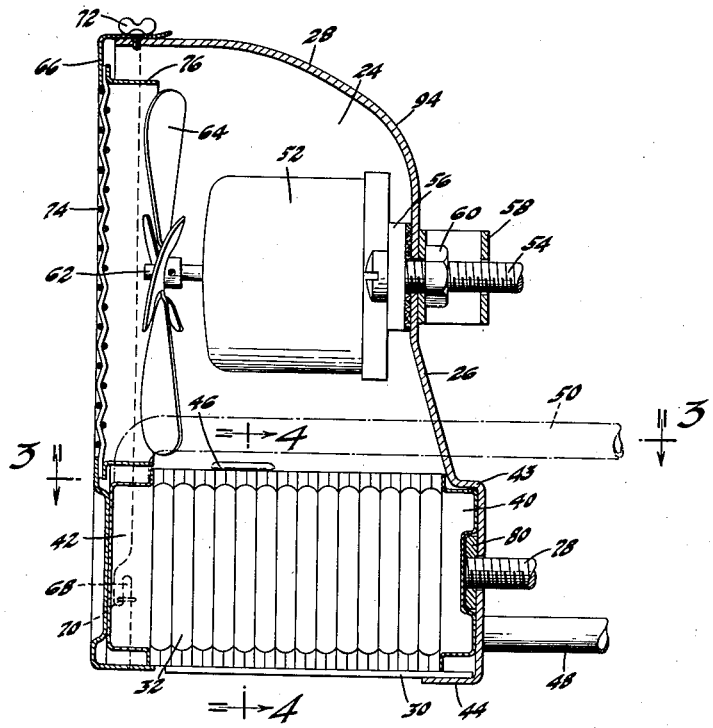
Figure 2 is a longitudinal vertical section drawn on a larger scale, through our improved heater.
Figure 3:
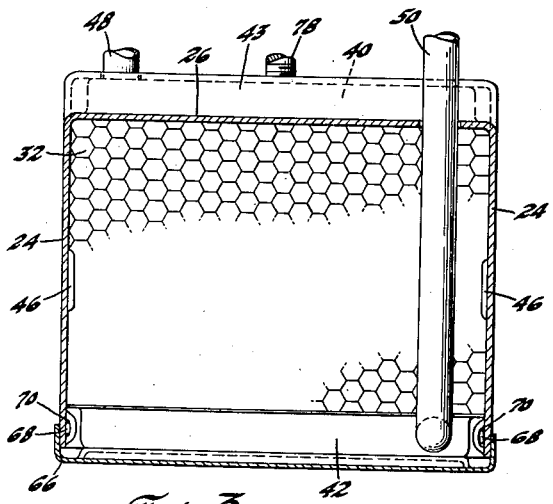
Figure 3 is a sectional view, taken on the line 3—3 of Figure 2.

The reference numeral 10 indicates an internal combustion engine of the water-cooled type, wherein the cooling water is forced by a pump 12 into water jackets surrounding the cylinders and combustion chamber, and thence out through a conduit 14 into the top of the radiator 16. After flowing down through the latter and becoming cooled, the water is drawn up from the bottom of the radiator through a conduit 17 by the pump 12. The usual dash board 18 separates the engine compartment from the body compartment, and in the latter the usual inclined toe boards 20 extend between the floor boards 22 and the dash board 18.

Figure 4:
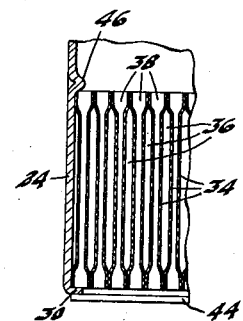
Figure 4 is a fragmentary sectional view, taken on the line 4—4 of Figure 2.

Our improved heater consists of a sheet metal casing having side walls 24, a front wall 26, and a top wall 28. The bottom of the casing is left open and the lower edges of the side walls are bent inwardly to form ledges 30. Supported on these ledges is a heat radiating unit 32, comprising a section of the well known hexagon cell type radiator core. As best shown in Figure 4, this core is made up of a plurality of pieces of thin sheet metal 34, which are bent up and soldered together to form water passages 36 and air passages 38. An inlet header 40 and an outlet header 42 are soldered to the pieces 34, thus forming a compact heat-radiating unit which may be slipped horizontally into the casing, the lower edges of the unit resting on top of the ledges 30. A depression or recess 43 is formed in the front wall of the casing, into which the inlet header 40 fits. The lower edge of the front wall 26 is bent under the ledges as at 44 to reinforce the latter. Struck-in portions 46 on the side walls serve to prevent upward movement of the heat radiating unit.

An inlet pipe 48 and an outlet pipe 50 are connected to the inlet and outlet headers respectively, and pass through openings in the front wall 26. An electric motor 52 is supported upon the front wall of the casing by bolts 54 which pass through the base 56 of the motor, and through a bent up sheet metal spacing member 58 which is provided to extend between the casing and the dash board when the heater is assembled upon the latter. Nuts 60 serve to secure both the motor and the spacing member to the front wall. A shaft 62 extends through the rear end of the motor and has secured to it a fan 64.

The open rear side of the casing is closed by a cover 66 which fits over the ouside of the casing, and has formed on it lugs 68 which slip up into slots 70 punched in the side walls 24. The upper end of the cover is secured to the casing by means of a wing nut 72, and it will be obvious that the cover can only be removed by unscrewing this wing nut, pulling the top portion of the cover away from the casing, and then sliding the cover downwardly enough to withdraw the lugs 68 from the slots 70. A circular opening of slightly larger diameter than the fan is provided in the cover opposite the fan, and a grille or screen 74 is held over this opening between the cover and a shroud 76, of circular shape, which is secured to the cover in any suitable manner.

As shown in Figure 1, the casing is adapted to be secured to the rear side of the dash board by means of the bolts 54, and a third bolt 78 which is secured in a plate 80 located on the inside of the front wall of the casing. Nuts 82 threaded on the bolts 54 and 78 serve to draw the casing tightly against the dash board. As the casing is being placed in position, the inlet and outlet pipes 48 and 50 pass through openings in the dash board, which openings are considerably larger in diameter than the pipes, in order that none of the weight of the casing will be carried by the pipes. This prevents strains being placed on the heat radiating unit which might cause leaks to develop in the latter.

After the casing has been mounted in position upon the dash board, a pipe or flexible conduit 84 is secured at one end to the inlet pipe 48, by any suitable clamping means 86, and the other end is placed in communication with the water jacket in the cylinder head. A valve 88 may be provided to shut off the circulation of the cooling liquid through the heat radiating unit when desired. Another pipe or flexible conduit 90 is secured at one end to the outlet pipe 50 by a clamp 92, and at the other end to the fitting which connects the conduit 17 to the bottom of the radiator. Since the water in the engine jackets is under pressure whenever the pump is being driven, the heated water will be forced through the conduit 84 into the inlet header 40, through the water passages 36 into the outlet header 42, and then returned to the pump through the conduit 90. As the hot water comes into the heat radiating unit at the bottom, and is discharged through the top, there is no possibility of air becoming trapped in any portion of it, which is objectionable since it results in a decrease in the area of heat radiating surface.

The electric motor 52 is, of course, connected by suitable wiring to the storage battery of the vehicle, and a switch for controlling the operation of the motor is located in a convenient place such as on the instrument board. This switch is preferably of the type which will allow the motor to run at two or more speeds. The fan 64 is so shaped that when it is driven by the motor 52 it will draw air in through the openings in the cover, and force it downwardly through the vertically extending air passages 38 in the heat radiating unit, whereupon the air will become heated to a temperature sufficiently high to warm the body compartment to a comfortable temperature in the coldest weather. The casing is so shaped that the front and top walls are connected by a long sweeping curved portion 94, which materially assists in causing the air to flow downwardly through the heat radiating unit. The grille or screen 74 is provided to prevent anything coming into contact with the fan while it is being driven. It will be noted that none of the space within the casing that is in the path of the air flow is occupied by the inlet or outlet headers, the former being located in the depression 43 provided for it, and the latter being located under the shroud 76. Thus all of the air which is drawn into the casing may pass directly through the heat radiating unit, there being no dead air spaces such as would be the case were the inlet and outlet headers located adjacent the side walls of the casing. The result is that all the space in the path of the air flow is occupied by heat radiating surfaces, and a greater heating efficiency in proportion to the size of the heater is attained.

By constructing the heater so that the heated air is directed downwardly instead of to the rear, several advantages over the usual hot water type heaters result. First, the heated air is caused to spread out when it strikes the inclined toe boards 20, and is diffused and deflected evenly toward the rear and sides of the body compartment, instead of being concentrated in a relatively small area, in which case it sometimes is objectionable in that it tends to flow upwardly into the faces of the occupants of the front seat. Second, the majority of the cold air which enters the body compartment does so through the openings around the foot pedals and around the doors. By directing the heated air downwardly and diffusing it outwardly toward the sides of the body, the cold air entering the latter is warmed before it comes into contact with the occupants, and no cold draughts are felt. Obviously warm air always ascends, and the only way to get it down around the passengers' feet is to force it in that direction. It has been found that in installations of certain types of hot water heaters which direct the air rearwardly, the space adjacent the floor boards never becomes heated to a temperature sufficiently high to warm the passengers' feet. Third, in the type of hot water heater where the heated air is blown rearwardly, should a leak develop in the heat radiating unit, the dirty and rusty water in the cooling circulating system would be blown back over the occupants of the front seat. In our improved heater construction, this would not be the case, as such leaking water would merely fall onto the floor boards, where it would do no particular damage. Fourth, since the heated air is discharged downwardly, the casing may be mounted high up on the dash board where it will be out of the way of the passengers' feet. It is not possible to do this with the type of heater wherein the air is discharged rearwardly, since in that type the casing must be mounted low enough on the dash board to permit the heated air to flow under the instrument board.

It will be readily seen that by supporting the heat radiating unit in the casing in the manner described, it may be easily removed for repairs by taking off the cover, loosening up the clamps 86 and 92, and removing the conduits 84 and 90 from the inlet and outlet pipes 48 and 50. The heat radiating unit may then be slipped out of the casing without disturbing the means which fasten the casing to the dash board, or the motor and its electrical connections. Similarly the motor may be removed from the casing without removing the casing from the dash board, or interfering in any way with the conduits connected to the heat radiating unit. Due to the arrangement of the fan relative to the heat-radiating unit, the depth of the casing is reduced over what would be required were the fan located behind the core, and a very neat and compact heater is the result. By supporting the casing rigidly on the dash board so that no weight is placed on the heat-radiating unit, vibration of the latter is prevented and there is little possibility of leaks developing.

It is thought from the foregoing, taken in connection with the accompanying drawings, that the construction and operation of the heater will be readily understood, and obviously various changes in size, shape, proportion and details of construction may be made without departing from the spirit and scope of the appended claims.

We claim:

1. A vehicle heater comprising a casing having an open side and bottom portions, a heat radiating unit supported in said casing adjacent said open bottom portion and having vertically extending air passages formed therein, a cover for the open side having an opening formed therein, and a motor driven fan supported in said casing and adapted to draw air in through the opening in the cover and force it downwardly through said air passages whereby it will be discharged through the opening in the bottom of said casing.

2. A vehicle heater comprising a casing, a heat radiating unit having air passages extending therethrough removably supported in said casing, a fan and a motor for driving same supported in said casing and adapted to cause air to flow through said passages, said heat radiating unit and said motor each being supported in such manner that either may be removed without disturbing the other.

3. A vehicle heater comprising a casing having openings in its walls, a heat radiating member including liquid and air passages, means to supply heated fluid to said liquid passages, a motor driven fan supported in said casing and adapted to draw air in through one of said openings and to force it through said air passages and then discharge it through the other opening, said heat radiating member being slidably supported in said casing in order that it may be easily removed for repairs or replacement purposes without disturbing said fan.

4. A vehicle heater comprising a casing, a heat radiating unit having air passages extending therethrough supported in said casing, a fan adapted to force air through said passages, a motor serving to drive said fan, and means serving to secure said motor in said casing and also to secure said casing to a portion of the vehicle.

5. A vehicle heater comprising a casing having a depression formed therein, a heat radiating unit including air passages and liquid passages and inlet and outlet headers for said liquid passages, said unit being supported in said casing, a cover for said casing having an opening formed therein, a shroud secured to the inside of said cover around said opening, a motor driven fan located in said casing and adapted to draw air in through said opening and to force it through said air passages in order that it may become heated before being discharged into the vehicle, said unit being so arranged in said casing that one of said headers fits into said depression and the other fits under said shroud in order that all of the space within said casing that is in the path of the air flow may be occupied by air and water passages.

6. A heat exchange unit comprising a housing having a fan chamber and a cradle therebelow, a radiator removably mounted in the cradle by a horizontal sliding movement, displaceable means holding the radiator against removal from the cradle, and a fan in the fan chamber.

7. A heat exchange unit comprising a housing having a fan chamber and a cradle therebelow, a radiator removably mounted in the cradle by a horizontal sliding movement, displaceable means holding the radiator against removal from the cradle, and a fan in the fan chamber, said radiator being provided with a fixed feed pipe arranged to be projected through an aperture in the housing during the movement of the radiator into the cradle.

8. A heat exchange unit comprising an open face housing having a fan chamber and a cradle therebelow, a radiator mounted in the cradle for removal through the open face of the housing, a fan shroud in the fan chamber at the open face of the housing, a face plate for the open face of the housing, common fastening means securing the face plate and the fan shroud to the housing, and a fan in the fan shroud.

CARL W. DARRAH.
JOHN R. HOLMES.